US006987658B2

(12) United States Patent
Lu et al.

(10) Patent No.: US 6,987,658 B2
(45) Date of Patent: Jan. 17, 2006

(54) IONIZER

(75) Inventors: Tsung-Lin Lu, Tainan Hsien (TW); Ying-Chi Chen, Taoyuan (TW)

(73) Assignee: Au Optronics Corp., Hsinchu (TW)

( * ) Notice: Subject to any disclaimer, the term of this patent is extended or adjusted under 35 U.S.C. 154(b) by 436 days.

(21) Appl. No.: 10/413,360

(22) Filed: Apr. 15, 2003

(65) Prior Publication Data

US 2004/0114299 A1 Jun. 17, 2004

(30) Foreign Application Priority Data

Dec. 13, 2002 (TW) .............................. 91136197 A

(51) Int. Cl.
*H02H 1/00* (2006.01)

(52) U.S. Cl. ...................................................... 361/212

(58) Field of Classification Search ................ 361/213, 361/212; 96/83, 84

See application file for complete search history.

(56) References Cited

U.S. PATENT DOCUMENTS 4,048,667 A * 9/1977 Brennecke .................. 361/213
4,265,641 A * 5/1981 Natarajan ...................... 95/79
6,365,088 B1 * 4/2002 Knight et al. ............... 264/436

* cited by examiner

*Primary Examiner*—Stephen W. Jackson
*Assistant Examiner*—Boris Benenson
(74) *Attorney, Agent, or Firm*—Troxell Law Office, PLLC

(57) ABSTRACT

An ionizer for eliminating static electricity on a large size substrate. The ionizer comprises a bar and a plurality of pin sets. The pin sets are located on the bar at a given interval, and a power line is located inside the bar. Each pin set comprises a plurality of pins and a plurality of nozzles. The pins connect to the power line, and the nozzles are located around the pins to spray charges on the substrate at a given spraying angle. By setting more pins in each pin set, the covering angle of the ionizer can be enlarged.

8 Claims, 8 Drawing Sheets

IONIZER

BACKGROUND OF THE INVENTION

1. Field of the Invention

This invention relates to an ionizer, and more particularly, to an ionizer for eliminating static electricity on a large size substrate.

2. Description of Related Art

Static electricity is usually caused when certain materials are rubbed against each other. An object that has static electricity charges built up on its surface has an electrical force field coming from the surface. This field will attract neutral particles and particles with opposite charges so that the surface of the object is easily contaminated. As a result, in the fabrication processes demanding serious cleanliness, such as lithographic and etching steps of semiconductor fabrication process, the formation of static electricity should be prevented.

The methods used to solve the problem of static electricity accumulation are: (1) grounding the apparatus to guide the charges from the surface of the object to the environment; (2) adjusting the humidity to prevent the formation of static electricity charges; (3) adding metal shielding to prevent the object from the influence of outer power source. Other to the methods mentioned above, an ionizer is usually used to spray charges on the surface of the object to neutralize static electricity charges.

According to the principle of static electricity elimination, the ionizer can be sorted into active, passive, air-added, and non air-added, wherein the active ionizer can be further sorted into DC type and AC type according to the connected power.

Referring to FIG. 1, which shows a traditional air-added AC ionizer. The ionizer comprises a bar 10 and a plurality of pin sets 20. Pressured air passes through the bar 10, and an AC power line 11 is located in the bar 10. The pin sets 20 are located on the bar 10 at intervals of 5–10 cm.

Referring to FIG. 2, which shows a pin set 20 of the traditional ionizer shown in FIG. 1. Each pin set 20 comprises a pin 21 electrically connecting to the power line 11 and a nozzle 22 located around the pin 21. The pin 21 is used to discharge charges and the nozzle 22 is used to spray the charges on the substrate. The spraying angle of the nozzle 22 shown in this figure is about 35 degrees, which is broadly used in industry.

When eliminating static electricity, the power line 11 is connected to an AC power supply and point discharge happens at the pins 21. The discharged charges are electrically alternated according to the AC power. By using the nozzles 22 to spray the pressured air on the substrate, the charges created near the pins 21 are moving to the substrate to neutralize the charges thereon.

However, in the condition of large size substrate, several weaknesses of the traditional ionizer are concerned.

Referring to FIG. 3, which shows static electricity eliminating in process by using the traditional ionizer. The covering angle of the ionizer is about 35 degrees, the distance between the ionizer and the substrate is D, and the related eliminating area is F. The length of the substrate is L, and the width is W. The substrate moves respect to the ionizer at a moving speed of V. When the size of substrate increases, the covering area maybe too small to offer proper static electricity eliminating efficiency.

Referring to FIG. 4, which shows static electricity eliminating in process by using the traditional ionizer when the length of the substrate is doubled. If the moving speed is fixed, the time needed to finish the static electricity eliminating process will elongate from L/V to 2L/V. On the other hand, if the time needed to finish the static electricity eliminating process is constrained to L/V, the speed should increase to 2V and the charges density received by the substrate is half the condition shown in FIG. 3. Therefore, the static electricity charges on the substrate surface may not be fully neutralized.

Referring to FIG. 5, which shows the static electricity eliminating in process by using a traditional ionizer when the distance between the ionizer and the substrate is doubled. If the covering angle of the ionizer fixes, the increasing of the distance D between the ionizer and the substrate will result in a wider eliminating area F' (F'>F). However, at the same time, the charge density decreases in a ratio square to the increasing ratio of the distance D, and the chance of opposite charges neutralization increases as the distance D increasing. Consequently, the density of the charges received by the substrate is too low to achieve reasonable neutralization efficiency.

Referring to FIG. 5, the distance between the ionizer and the substrate increases from D to 2D, so that the space for setting the ionizer is doubled and the cost is increased.

SUMMARY OF THE INVENTION

It is one object of the present invention to provide an ionizer to solve the problems mentioned above.

The ionizer of the present invention comprises a bar with a power line located therein and a plurality of pin sets situated on the bar at intervals of 5–10 cm. Each pin set comprises a plurality of pins electrically connecting to the power line. By adjusting the direction of the pins of each pin set, the spraying angle of the pin set is increased. Therefore, the covering angle of the ionizer is also increased, and the problems resulted from large size substrate can be alleviated.

The advantage and spirit of the invention may be understood by the following recitations together with the appended drawings.

DETAIL DESCRIPTION OF THE PREFERRED EMBODIMENT

This invention provides an ionizer with a plurality of pin sets located thereon, and each pin set comprises a plurality of pins for increasing the covering angle of the ionizer.

Figure 6A:
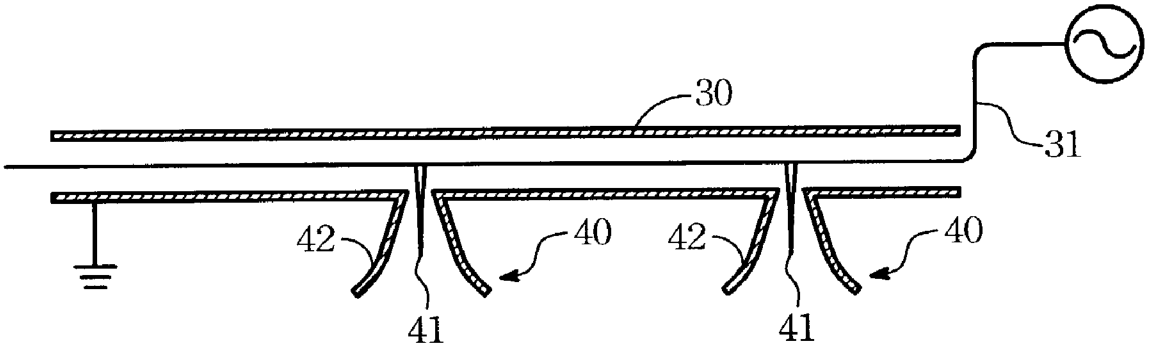
FIGS. 6A and 6B show the first embodiment of the ionizer according to the present invention.
Figure 6B:
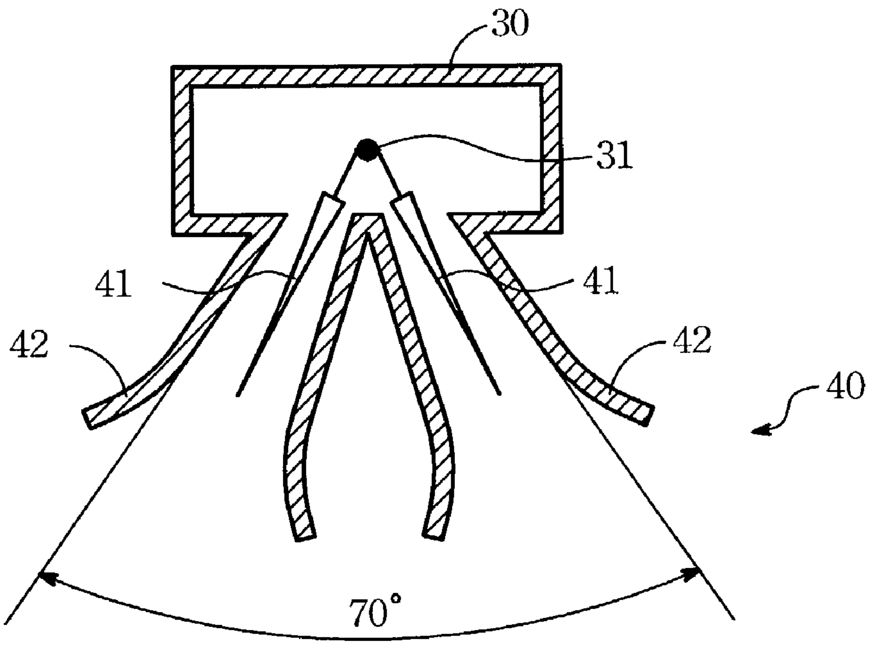

Referring to FIGS. 6A and 6B, which shows a side view and a cross section view of the first embodiment of the ionizer according to the present invention. The ionizer comprises a bar 30 and a plurality of pin sets 40. Pressured air passes through the bar 30, and an AC power line 31 is located in the bar. The pin sets 40 are located on the bar 30 at intervals of 5–10 cm. Each pin set 40 comprises two pins 41 electrically connecting to the power line 31 and two nozzles 42 located around the pins individually.

While eliminating static electricity, the power line 31 is connected to an AC power supply and point discharge happens at the pin 41. The discharged charges are electrically alternated according to the AC power. By using the nozzle 42 to spray the pressured air on the substrate, the charges created near the pin 41 are moving to the substrate to neutralize the charges thereon.

Figure 1:
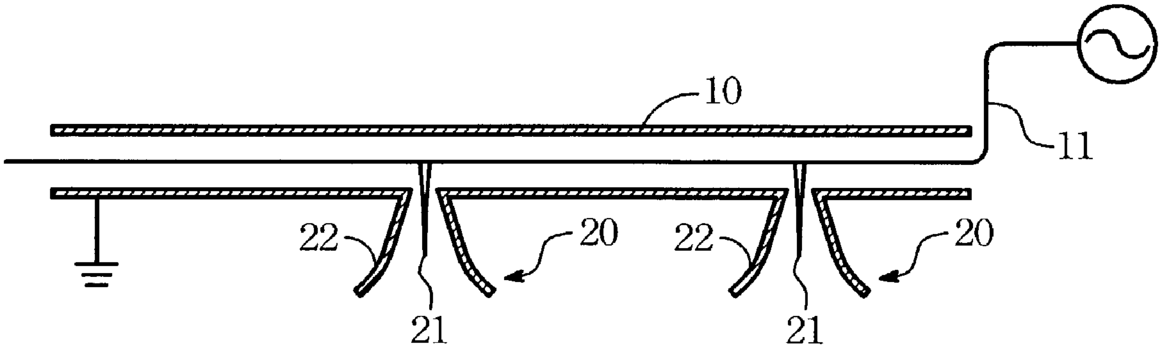
Fig. 1 (Prior Art)
FIG. 1 shows a traditional AC air-added ionizer.
Figure 2:
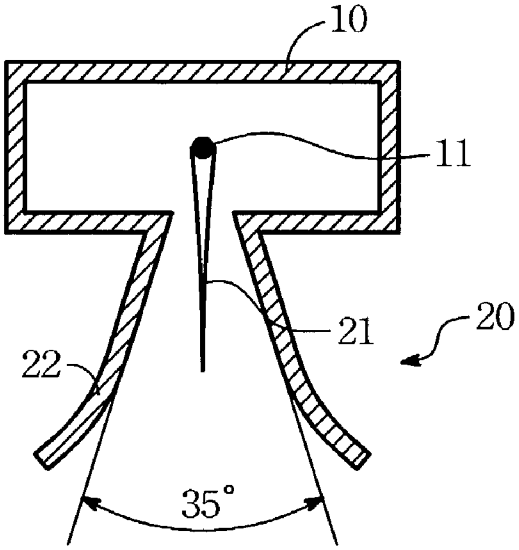
Fig. 2 (Prior Art)
FIG. 2 shows a traditional pin set.
Figure 7:
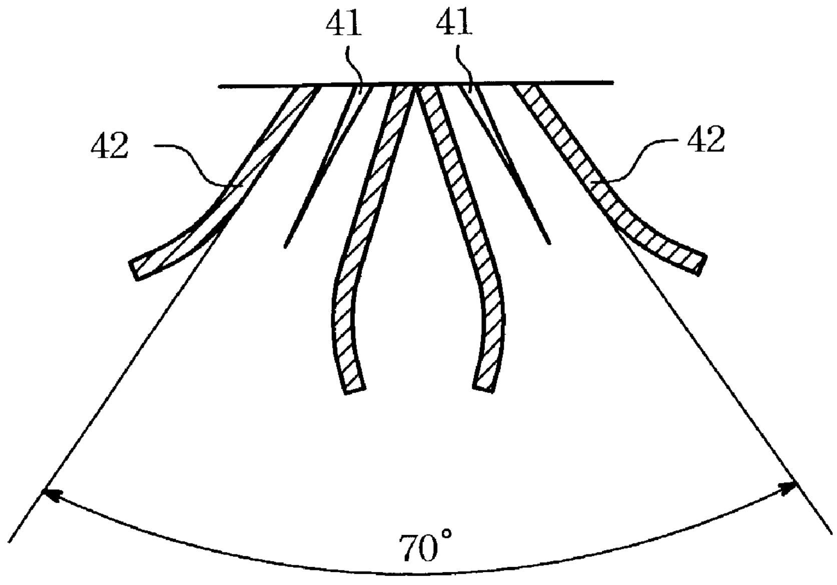
FIG. 7 shows the spraying angle of the pin set according to the present invention.

Referring to FIG. 7, which shows spraying angle of the pin set shown in FIG. 6. The areas covered by the two nozzles 42 in the same pin set 40 are neighboring to each other but not overlapped. As a result, the spraying angle of the pin set can reach 70 degrees, which is double the spraying angle of the traditional pin set 40 shown in FIG. 2.

Figure 3:
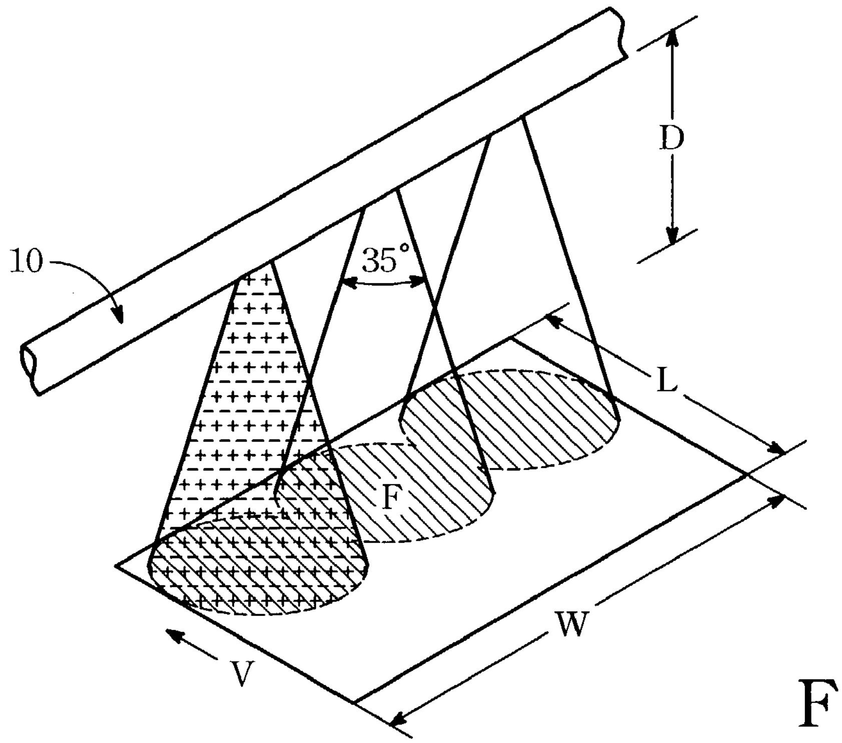
Fig. 3 (Prior Art)
FIG. 3 shows static electricity eliminating in process by using a traditional ionizer.
Figure 4:
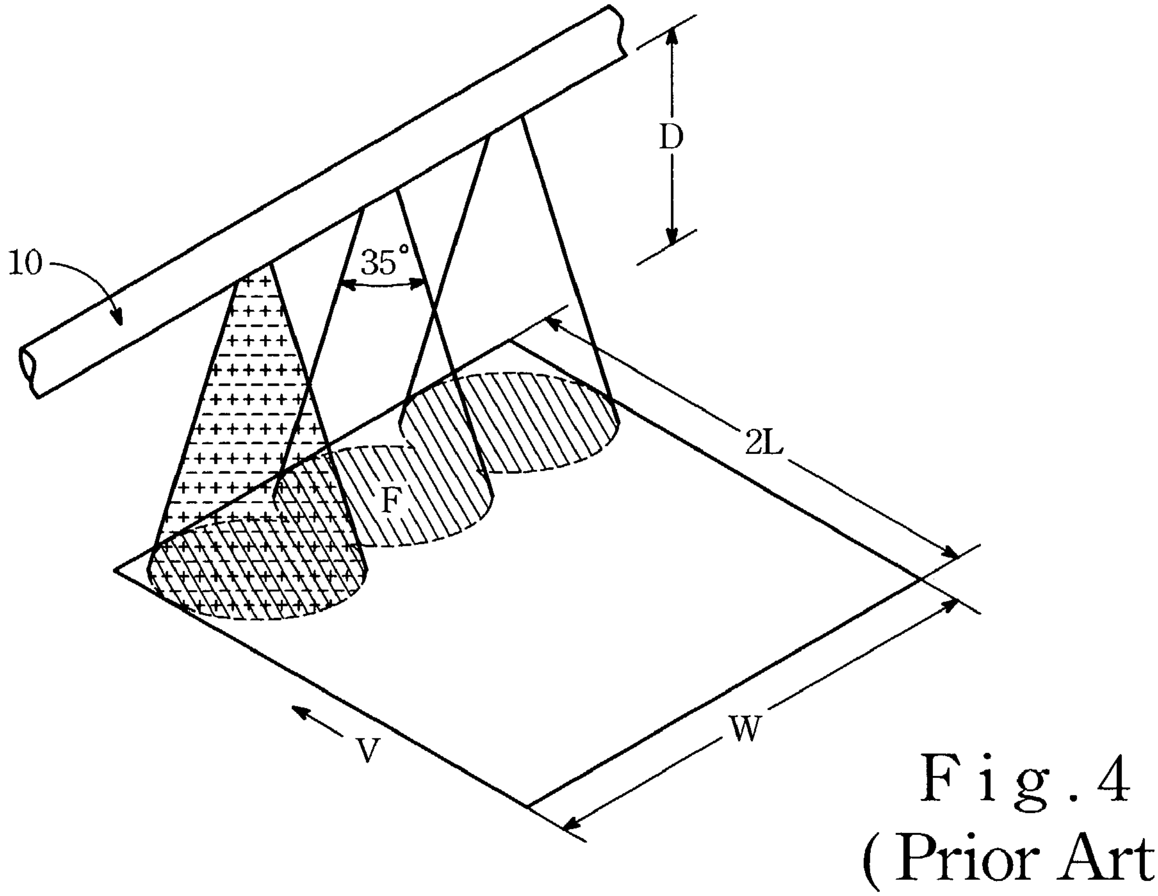
Fig. 4 (Prior Art)
FIG. 4 shows static electricity eliminating in process by using a traditional ionizer when the length of the substrate is doubled.
Figure 5:
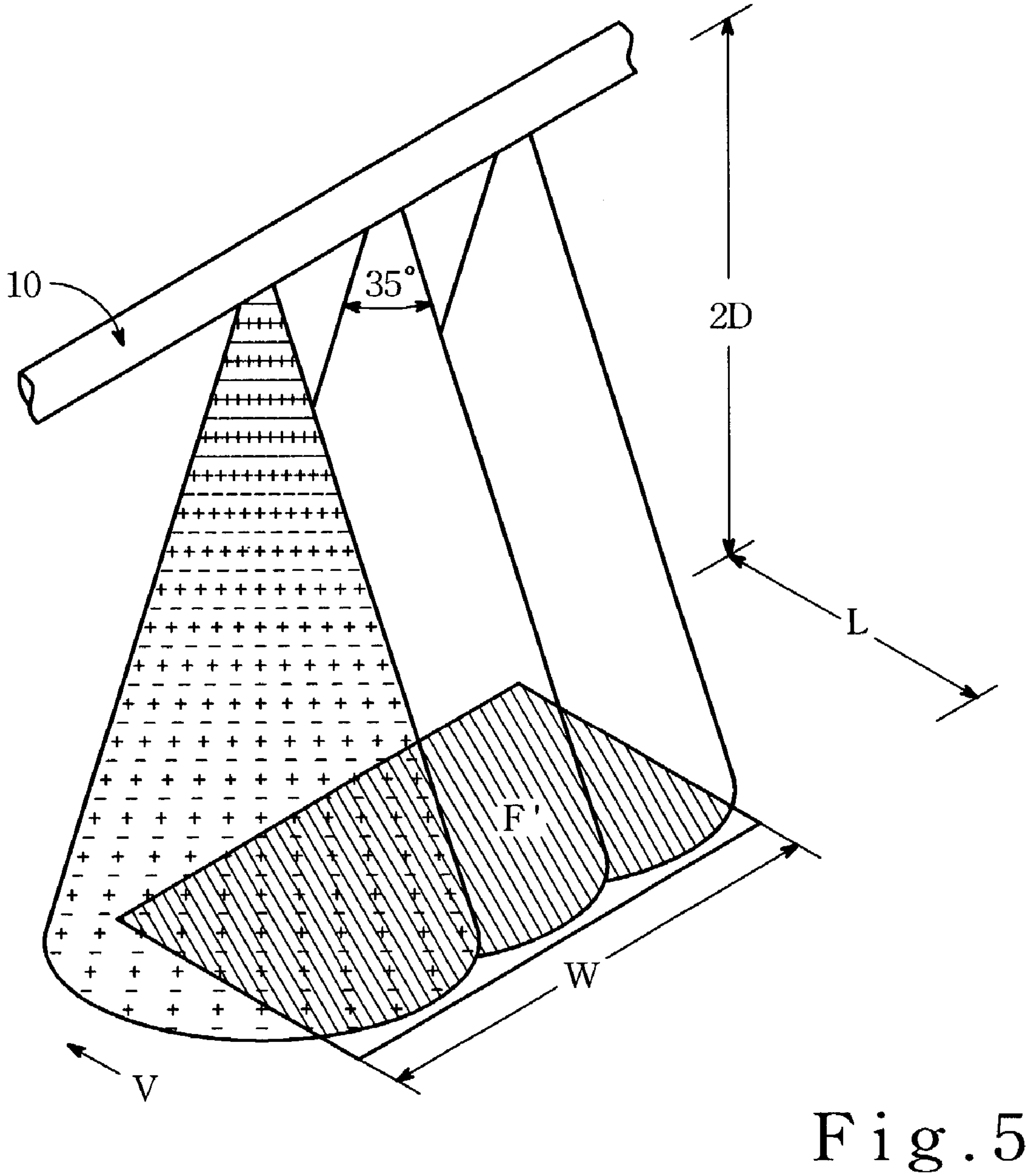
Fig. 5 (Prior Art)
FIG. 5 shows static electricity eliminating in process by using a traditional ionizer when the distance between the ionizer and the substrate is doubled.
Figure 8:
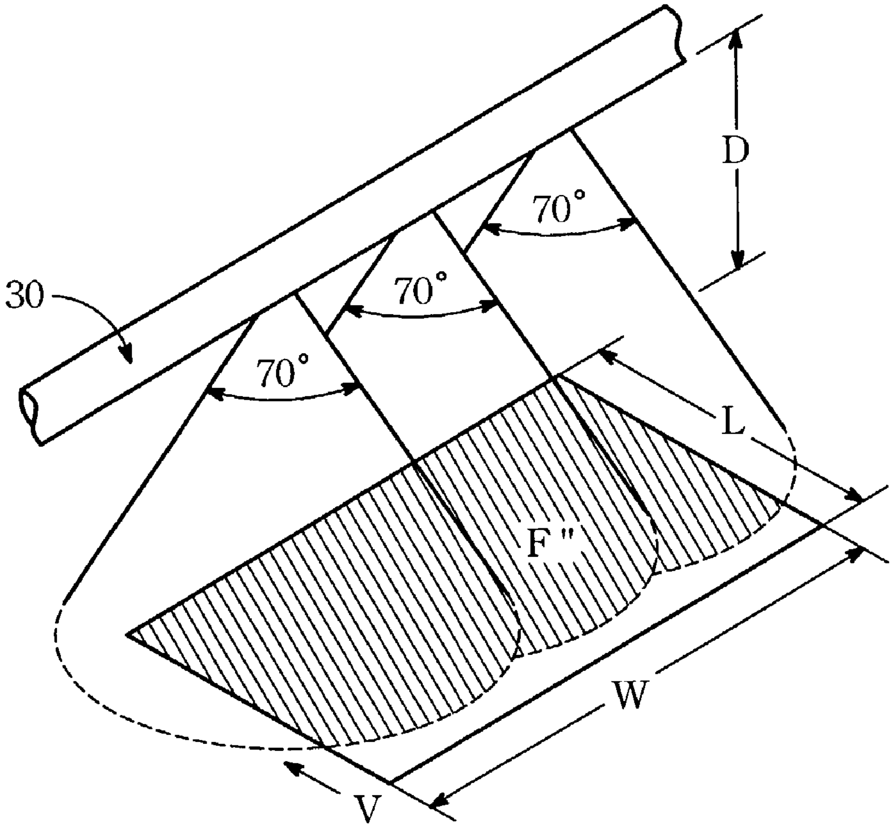
FIG. 8 shows static electricity eliminating in process by using the ionizer according to the present invention.

As shown in FIG. 8, which shows static electricity eliminating in process by using the ionizer shown in FIG. 6. The covering angle of the ionizer is about 70 degrees, the distance between the ionizer and the substrate is D, and the related eliminating area of the ionizer is F". Comparing to the traditional ionizer shown in FIG. 3, the covering angle according to the present invention is double the case shown in FIG. 3 so that the eliminating area increases (F">F).

Figure 9A:
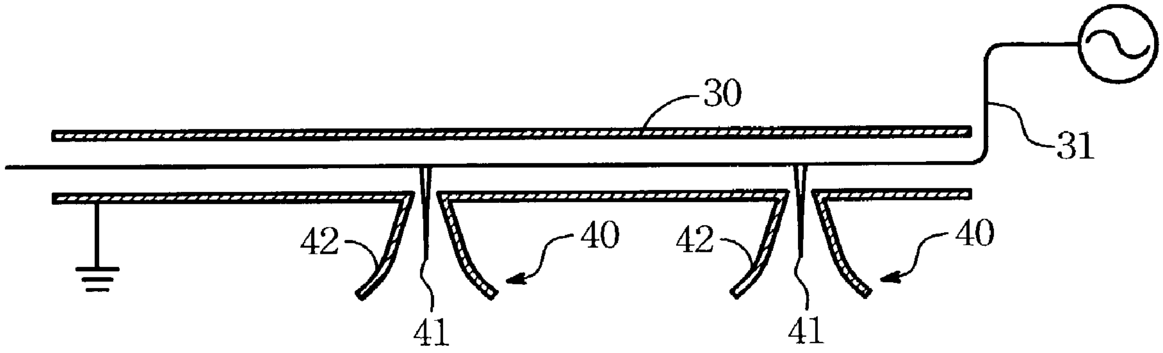
FIGS. 9A and 9B show the second embodiment of the ionizer according to the present invention.
Figure 9B:
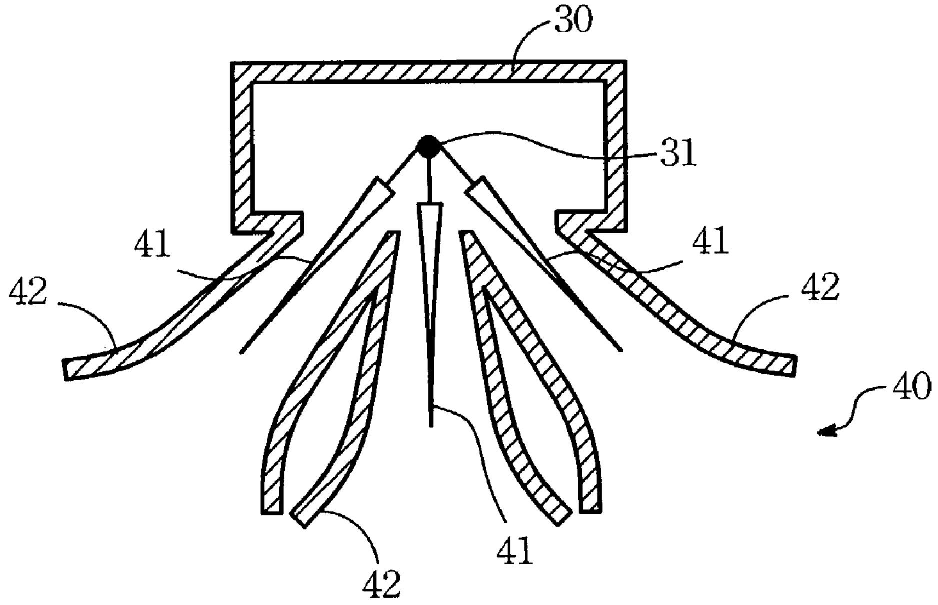

FIGS. 9A and 9B show a side view and a cross section view, respectively, of the second embodiment of the ionizer according to the present invention. The ionizer comprises a bar 30 and a plurality of pin sets 40. Pressured air passing through the bar 30, and an AC power line 31 is located in the bar. The pin sets 40 are located on the bar 30 at intervals of 5–10 cm. Each pin set 40 comprises three pins 41 and three nozzles 42 therein so that the covering angle of the ionizer is larger than the case shown in FIG. 6. By further increasing the number of pins 41 and the related nozzles 42 of the ionizer, larger covering angle can be achieved.

Figure 10A:
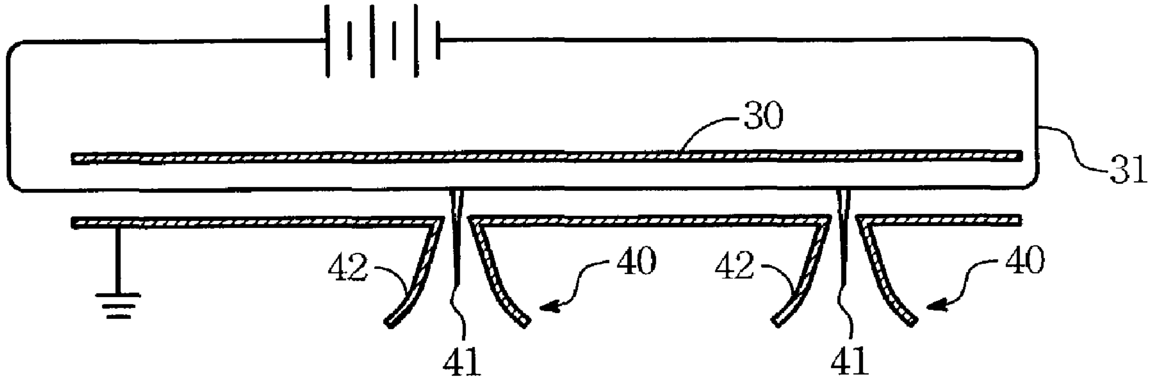
FIGS. 10A and 10B show the third embodiment of the ionizer according to the present invention.
Figure 10B:
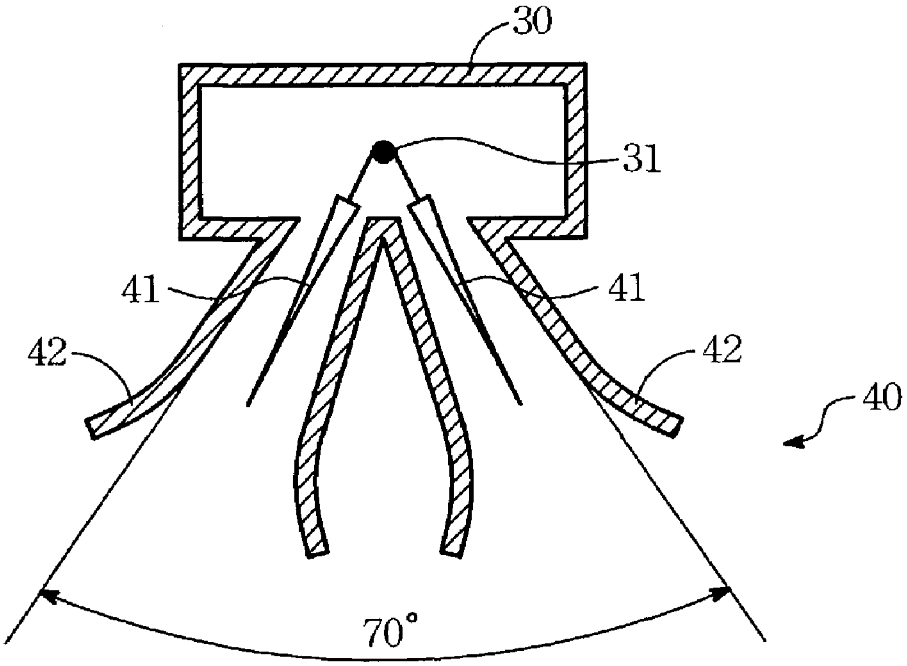

FIGS. 10A and 10B show a side view and a cross section view, respectively, of the third embodiment of the ionizer according to the present invention. The ionizer comprises a bar 30 and a plurality of pin sets 40. Pressured air passing through the bar 30, and a DC power line 31 is located in the bar. The pin sets 40 are located on the bar 30 at intervals of 5–10 cm. Each pin set 40 comprises two pins 41 and two nozzles 42 therein. The DC power line 31 is connected to a DC power supply so that the charge discharged near the pin 41 possess the same charge as the DC power supply.

Figure 11A:
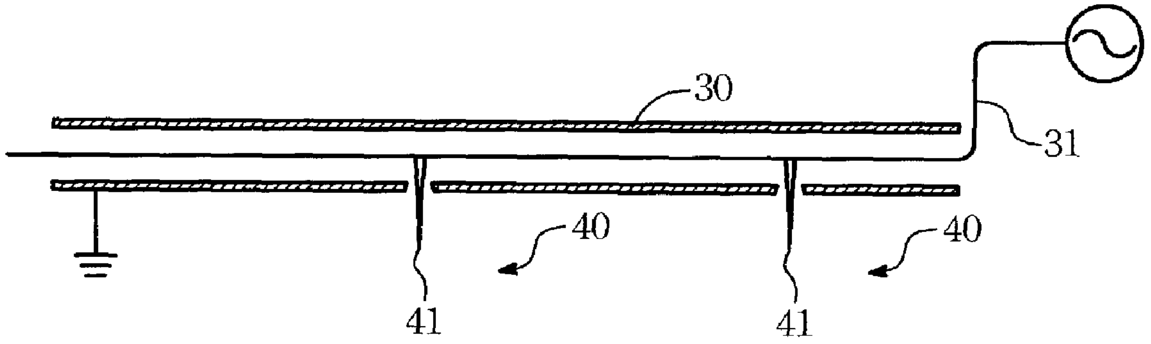
FIGS. 11A and 11B show the fourth embodiment of the ionizer according to the present invention.
Figure 11B:
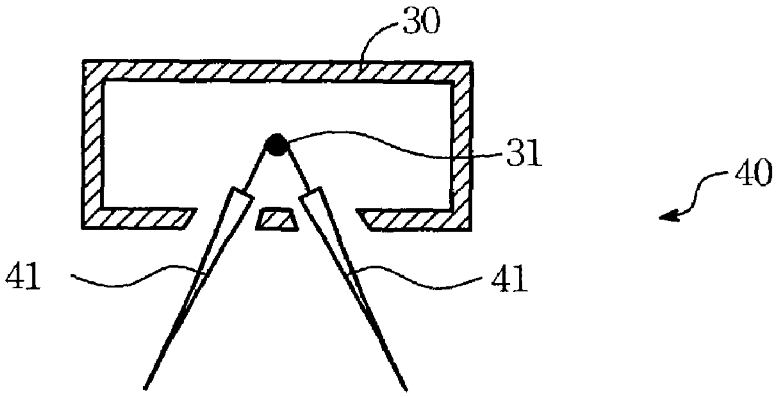

FIGS. 11A and 11B show a side view and a cross section view, respectively, of the fourth embodiment of the ionizer according to the present invention. The ionizer comprises a bar 30 and a plurality of pin sets 40. An AC power line is located in the bar and the pin sets 40 are located on the bar 30 at intervals of 5–10 cm. Each pin set 40 comprises two pins 41. This embodiment is a case of non air-added ionizer with no pressured air and nozzles 42 being added, and the covering angle of the non air-added ionizer is also enlarged.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An ionizer for eliminating static electricity on a large size substrate, comprising:

a bar having a power line located therein; and a plurality of pin sets located on the bar at certain intervals, and each of said pin sets comprising a plurality of pins situated perpendicular to the axis of the bar, wherein an angle is formed between the neighboring two pins of the same pin set, and the pins connect to the power line for discharging charges to neutralize the static electricity charges on the substrate.

2. The ionizer of claim 1, wherein said angle between the neighboring two pins of the same pin set is substantially between 10 to 60 degrees.

3. The ionizer of claim 1, wherein said power line is connected to an AC power supply.

4. The ionizer of claim 1, wherein said power line is connected to a DC power supply.

5. The ionizer of claim 1, wherein said interval of the neighboring pin sets is about 5 to 10 cm.

6. The ionizer of claim 1, wherein each of said pins comprises a nozzle located around the pin to spray the charges discharged from the pin on the substrate.

7. The ionizer of claim 6, wherein said bar comprises pressured air passing through the bar, and the pressured air is sprayed from the nozzle for taking the charges discharged from the pin to the substrate.

8. The ionizer of claim 7, wherein said nozzle sprays the charges at a spraying angle about 35 degrees.

* * * * *